US007274439B2

(12) United States Patent
Kurth

(10) Patent No.: US 7,274,439 B2
(45) Date of Patent: Sep. 25, 2007

(54) PRECISE, NO-CONTACT, POSITION SENSING USING IMAGING

(75) Inventor: Antony J. Kurth, Bradenton, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/004,743

(22) Filed: Dec. 3, 2004

(65) Prior Publication Data

US 2006/0055912 A1 Mar. 16, 2006

Related U.S. Application Data

(60) Provisional application No. 60/608,819, filed on Sep. 10, 2004.

(51) Int. Cl.
*G01P 3/36* (2006.01)

(52) U.S. Cl. ........................................ 356/28; 356/28.5

(58) Field of Classification Search .................. 356/28
See application file for complete search history.

(56) References Cited

U.S. PATENT DOCUMENTS 3,039,316 A 6/1962 Slater
3,056,303 A 10/1962 Naylor
3,365,942 A 1/1968 Blazek
3,439,546 A 4/1969 Baker et al.
3,576,124 A 4/1971 O'Connor
3,670,585 A 6/1972 Alexander et al.
3,769,710 A 11/1973 Reister
3,782,167 A 1/1974 Stuelpnagel
4,003,265 A 1/1977 Craig et al.
4,150,579 A 4/1979 Vaughn
4,244,215 A 1/1981 Merhav
4,515,486 A 5/1985 Ide
4,671,650 A * 6/1987 Hirzel et al. .................. 356/28
4,711,125 A 12/1987 Morrison (Continued)

FOREIGN PATENT DOCUMENTS

GB 866473 4/1961

(Continued)

OTHER PUBLICATIONS

Ng, "The Optical Mouse as a Two-Dimensional Displacement Sensor," *Sensors and Actuators A*, Elsevier Sequoia S.A., Lausanne, CH., vol. 107(1), Oct. 1, 2003, pp. 21-25.

(Continued)

*Primary Examiner*—Thomas H. Tarcza
*Assistant Examiner*—Luke D. Ratcliffe
(74) *Attorney, Agent, or Firm*—Fogg & Powers LLC

(57) ABSTRACT

A contact free optical motion sensor for an inertial reference system. One or more image acquisition systems are adapted to produce a series of overlapping images of a gas bearing supported spherical inertial sensor assembly. A controller coupled to receive the series of overlapping images applies a delta detection algorithm to the series of overlapping images to determine the distance, the direction of movement of the inertial sensor assembly and the resulting relative position of the gas bearing supported spherical inertial sensor assembly. The controller further calculates the rotational velocity of the inertial sensor assembly based on a time sequence between the received series of image signals and the distance moved.

5 Claims, 5 Drawing Sheets

200
206
Y-axis
204
210
202
204
206
209
208
206

U.S. PATENT DOCUMENTS

| | | | | |
|---|---|---|---|---|
| 4,723,735 | A | 2/1988 | Eisenhaure et al. | |
| 4,917,330 | A * | 4/1990 | Dulat et al. | 244/3.16 |
| 5,067,084 | A | 11/1991 | Kau | |
| 5,088,825 | A | 2/1992 | Derry et al. | |
| 5,099,430 | A | 3/1992 | Hirsch | |
| 5,319,577 | A | 6/1994 | Lee | |
| 5,357,437 | A | 10/1994 | Polvani | |
| 5,396,326 | A | 3/1995 | Knobbe et al. | |
| 5,710,559 | A | 1/1998 | Krogmann | |
| 5,894,323 | A * | 4/1999 | Kain et al. | 348/116 |
| 6,172,665 | B1 | 1/2001 | Bullister | |
| 6,481,672 | B1 | 11/2002 | Goodzeit et al. | |
| 6,594,623 | B1 | 7/2003 | Wang et al. | |
| 6,594,911 | B2 | 7/2003 | Brunstein et al. | |
| 6,629,778 | B1 | 10/2003 | Enderle et al. | |
| 6,741,209 | B2 | 5/2004 | Lee | |
| 6,826,478 | B2 | 11/2004 | Riewe et al. | |
| 7,003,399 | B1 | 2/2006 | Chappell | |
| 2002/0077189 | A1 | 6/2002 | Tuer et al. | |
| 2003/0120425 | A1 | 6/2003 | Stanley et al. | |
| 2004/0015323 | A1 | 1/2004 | Boyton | |
| 2004/0075737 | A1 | 4/2004 | Kirby | |
| 2004/0089083 | A1 * | 5/2004 | Bailey | 74/5.4 |
| 2004/0212803 | A1 | 10/2004 | Siegl et al. | |

FOREIGN PATENT DOCUMENTS

| | | |
|---|---|---|
| GB | 878939 | 10/1961 |
| GB | 1015681 | 1/1966 |
| GB | 1284195 | 8/1972 |
| GB | 2166920 | 5/1986 |
| WO | 9505547 | 2/1995 |
| WO | 2004023150 | 3/2004 |

OTHER PUBLICATIONS

Benbasat, "An Inertial Measurement Unit for User Interfaces", Sep. 8, 2000, pp. 1-100, Publisher: Massachusetts Institute of Technology, Published in: MA, USA.

El-Sheimy et al., "Structural Monitoring Using Wirelessly Connected MEMS-Based Sensors: Towards System Development", Feb. 18, 2003, pp. 1-10, Publisher: ICPCM, Published in: Cairo, Egypt.

IBM CORP., "The Tracking Cube: A Three Dimensional Input Device", Aug. 1, 1989, pp. 91-95, vol. 32, No. 3B, Publisher: IBM Technical Disclosure Bulletin, Published in: NY, US.

* cited by examiner 204
206
Y-axis
210
206
209
202
204
206
200
208

PRECISE, NO-CONTACT, POSITION SENSING USING IMAGING

CROSS REFERENCE TO RELATED APPLICATIONS

This application is related to and claims the benefit of the filing date of U.S. Provisional Application No. 60/608,819 filed on Sep. 10, 2004, entitled GENERALIZED INERTIAL MEASUREMENT ERROR REDUCTION THROUGH MULTIPLE AXIS ROTATION DURING FLIGHT, which is incorporated herein by reference.

This application is related to co-pending U.S. patent application Honeywell docket number H0006540-1628, filed on even date herewith and entitled "GAS SUPPORTED INERTIAL SENSOR SYSTEM AND METHOD" (the '6540 Application). The '6540 Application is incorporated herein by reference.

This application is also related to the following applications filed on even date herewith, all of which are hereby incorporated herein by reference:

U.S. patent application Honeywell docket number H0007169-1628, entitled "SPHERICAL POSITION MONITORING SYSTEM," (the '7169 Application);

U.S. patent application Honeywell docket number H0007167-1628, entitled "ABSOLUTE POSITION DETERMINATION OF AN OBJECT USING PATERN RECOGNITION," (the '7167 Application);

U.S. patent application Honeywell docket number H0007194-1628, entitled "THREE DIMENSIONAL BALANCE ASSEMBLY," (the '7194 Application);

U.S. patent application Honeywell docket number H0006475-1628, entitled "ARTICULATED GAS BEARING SUPPORT PADS," (the '6475 Application);

U.S. patent application Honeywell docket number H0006535-1628, entitled "GAS JET CONTROL FOR INERTIAL MEASUREMENT UNIT," (the '6535 Application);

U.S. patent application Honeywell docket number H0006345-1628, entitled "RF WIRELESS COMMUNICATION FOR DEEPLY EMBEDDED AEROSPACE SYSTEMS," (the '6345 Application); and U.S. patent application Honeywell docket number H0006368-1628, entitled "GENERALIZED INERTIAL MEASUREMENT ERROR REDUCTION THROUGH MULTIPLE AXIS ROTATION DURING FLIGHT," (the '6368 Application).

TECHNICAL FIELD

The present invention generally relates to the field of motion sensors and in particular to contact free optical motion sensing for inertial reference systems.

BACKGROUND

Precision inertial navigation systems typically require concentric sets of ball bearing supported gimbals which allow instruments to freely rotate in flight maneuvers and allow them to be manipulated for calibration. The embodiments of the previously referenced '6540 Application, which is herein incorporated by reference, eliminate the need for gimbals and ball bearings by supporting the inertial sensor assembly with a spherically shaped gas bearing. The gas bearing allows rotation of the inertial sensor assembly in all axes with no wear due to contact between rotating surfaces. However, because physical contact with the freely rotating inertial sensor assembly is undesirable, the need arises to sense the motion of the inertial sensor assembly without physical contact between the sensor and the assembly.

An optical computer mouse is one example of a low cost sensor that detects relative movement with respect to a flat surface without the need for physical contact between the mouse and the surface. The optical mouse system includes an image acquisition system (IAS) and a digital signal processor (DSP). The IAS forms an image of the microscopic textural features of the surface below the sensor. A sequence of these images is taken quickly so that the sequential pictures overlap. The images are processed by the DSP to determine the relative direction and distance of motion between the surface and the sensor. The DSP further produces a stream of relative delta-x and delta-y displacement values along the x and y axis. The resulting displacement data is provided by the output of the mouse to the computer. The data is used by the computer to relocate an on-screen pointer in coordination with movement of the mouse.

The algorithms translating mouse movement into cursor movement are nonlinear in order to aid the user with quickly selecting the desired object on the monitor. A human viewing the computer screen and operating the mouse provides the required feedback loop to ensure that cursor controlled by the mouse is accurately positioned on the screen. Precise calculations of the exact distance, direction and velocity of relative motion between the mouse sensor and surface are not necessary for this application and thus are not determined. For these reasons, the optical navigation system applied by optical computer mice is inadequate in applications where the precise direction and distance of displacement and velocity of an object is required.

For the reasons stated above and for other reasons stated below which will become apparent to those skilled in the art upon reading and understanding the specification, there is a need in the art for contact free precision motion detection system.

SUMMARY

The Embodiments of the present invention address the problem of sensing and measuring the movement of an object, where physical contact with the object is undesirable, through the use of optical imaging.

In one embodiment, a motion detection system is disclosed. One or more optical sensors each generate image signals of an object. A controller is coupled with each sensor to receive the image signals and adapted to apply a delta detection algorithm to the image signals to determine the distance and direction the object has moved. The controller further calculates the velocity of the object's movement based on a time sequence between the received series of image signals and the distance moved.

In another embodiment, another motion detection system is disclosed. One or more image acquisition systems are adapted to produce a series of overlapping images of the object. A controller is coupled to receive the series of overlapping images from each image acquisition system. The controller measures the elapsed time between images in the series, and applies a delta detection algorithm to the series of overlapping images in order to determine the distance and direction the object has moved. The controller calculates the velocity of the object's movement based on the elapsed time between images and the distance moved.

In another embodiment, a rotational displacement sensing apparatus for an inertial navigation system containing a gas bearing supported spherical inertial sensor assembly is disclosed. One or more image acquisition systems are adapted to produce a series of overlapping images of the inertial sensor assembly. A controller coupled to receive the series of overlapping images applies a delta detection algorithm to the series of overlapping images to determine the distance, the direction of movement of the inertial sensor assembly and the resulting relative position of the gas bearing supported spherical inertial sensor assembly. The controller further calculates the rotational velocity of the inertial sensor assembly based on a time sequence between the received series of image signals and the distance moved.

In still another embodiment, a method for precisely determining the relative movement and velocity of a moving object is disclosed. The method comprising capturing a first image of the object precisely at a first known time; capturing a second image of the object precisely at second known time such that the first and second images are taken in sufficiently proximate times that the first and second images are overlapping images of the object; and processing the first and second images through a delta detection algorithm, where the delta detection algorithm determines how far the object has moved, the direction of movement, and the rate of change in position of the object.

In still another embodiment, another method for precisely determining the relative movement and velocity of a moving object is disclosed. The method comprising capturing a first image of the object; associating a time stamp reference to the first image; capturing a second image of the object, where the first and second images are taken in sufficiently proximate times so that the first and second images are overlapping images of the object; associating a time stamp reference to the second image; determining the direction of movement and distance moved by the object by applying a delta detection algorithm to the images; and determining the velocity of the object based on the distance moved and the difference in time between the time stamp references associated with the images.

In yet another embodiment, another method for precisely determining the relative movement and velocity of a moving object is disclosed. The method comprising capturing a plurality of images of the object; where each image is taken in sufficiently proximate time so that subsequent images are overlapping images of the object; associating a time stamp reference to each of the images captured; determining the direction of movement and distance moved by the object by applying a delta detection algorithm to the images; and determining the velocity of the object based on the distance moved and the difference in time between the time stamp references associated with the images.

In yet another embodiment, another method for precisely determining the relative movement and velocity of a moving object is disclosed. The method comprising aligning an optical computer mouse sensor to the surface of an object; coupling the optical mouse sensor to a computer I/O port; accumulating x-axis and y-axis displacement data communicated by the optical computer mouse sensor to the computer I/O port, from time T1 to time T2; calculating the distance and direction of movement of the object, the average velocity of movement, and the resulting relative position of the object.

In still another embodiment, another motion detection system is disclosed. One or more optical computer mice are aligned to capture images of an object. A computer is coupled to receive x-axis and y-axis displacement data generated by the mice and to accumulate the x-axis and y-axis displacement over a time interval. The computer is further adapted to calculate the distance and direction of movement of the object, the average velocity of movement, and the resulting relative position of the object.

In yet another embodiment, a method for precisely determining the relative movement and velocity of a moving object, where the method is embedded in a computer-readable medium is disclosed. The method comprising capturing a first image of an object precisely at a first known time; capturing a second image of the object precisely at second known time, where the first and second images are taken in sufficiently proximate times so that the first and second images are overlapping images of the object; processing the first and second images through a delta detection algorithm, where the delta detection algorithm determines how far the object has moved, the direction of movement; and calculating the velocity of the object.

DRAWINGS

The present invention can be more easily understood and further advantages and uses thereof more readily apparent, when considered in view of the description of the preferred embodiments and the following figures in which:

FIGS. 1*a* and 1*b* are diagrams illustrating precise, no-contact, position sensing using imaging, with an object having a planar surface. FIG. 1*a* is a side view of the current invention and FIG. 1*b* is a front view of the current invention;

In accordance with common practice, the various described features are not drawn to scale but are drawn to emphasize features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Precision inertial navigation systems typically require concentric sets of ball bearing supported gimbals which allow instruments to freely rotate in flight maneuvers and allow them to be manipulated for calibration. The embodiments of the previously referenced commonly assigned '6540 Application, which is herein incorporated by reference, eliminate the need for gimbals and ball bearings by supporting the inertial sensor assembly with a spherically shaped gas bearing. The gas bearing allows rotation of the inertial sensor assembly in all axes with no wear due to contact between rotating surfaces. However, because the gas bearing eliminates physical reference points provided by the gimbals, and because physical contact with the freely rotating inertial sensor assembly is undesirable, the need arises to sense the motion, velocity and position of the inertial sensor assembly, without physical contact between the sensor and the assembly. The embodiments of the present invention address the problems of contact free motion sensing by applying optical navigation technology to create precision, no-contact motion sensing.

Figure 1B:
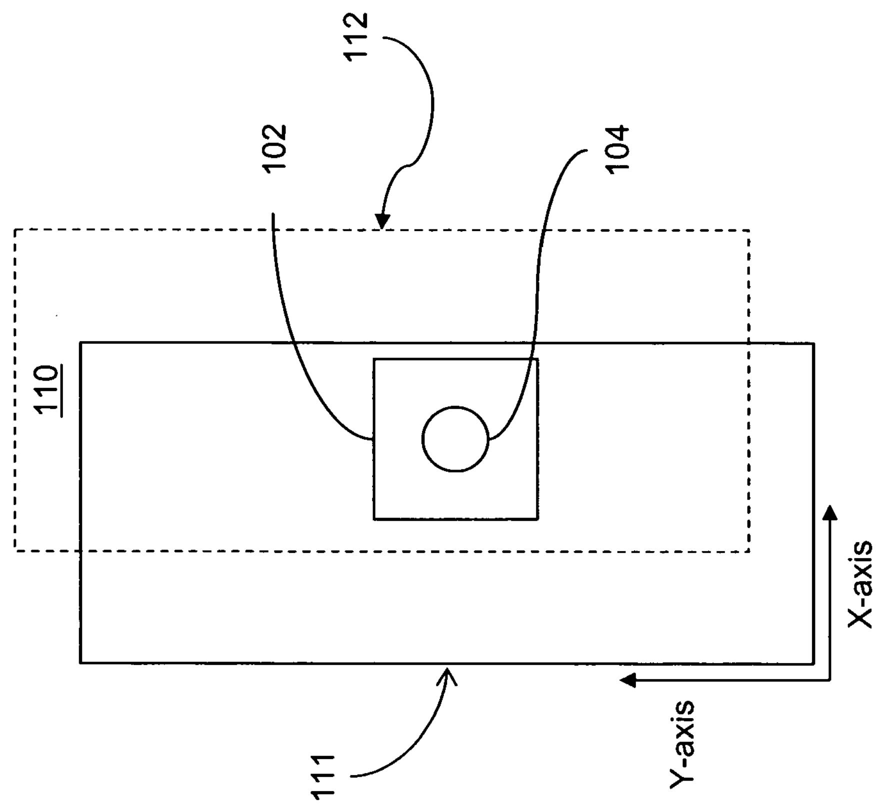
Figure 1A:
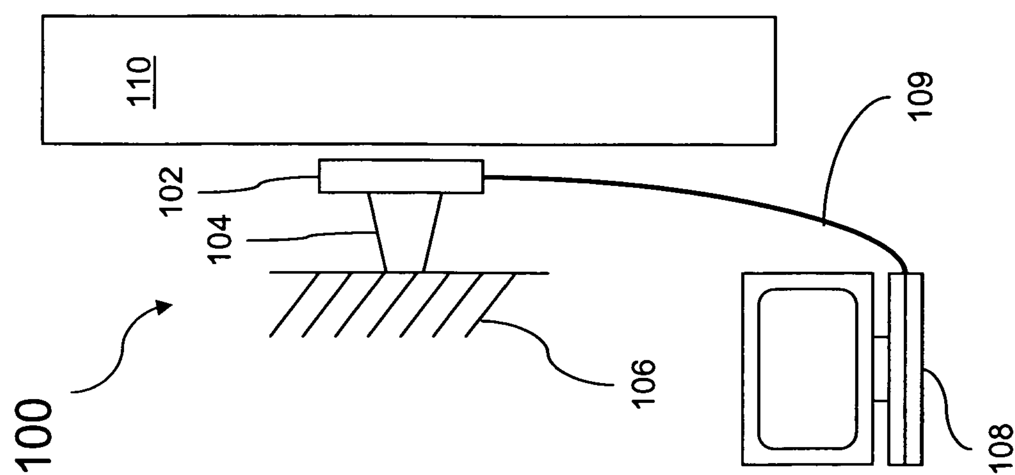

In FIGS. 1*a* and 1*b*, a motion detection system 100 of one embodiment of the present invention is illustrated. FIG. 1*a* is a side view of the motion detection system 100 adapted to determine the precise relative motion of the surface of an object 110 with respect to the optical sensor 102. FIG. 1*b* is a front view of the same embodiment. An optical sensor 102, also commonly referred to as an image acquisition system, is rigidly connected by a mounting bracket 104 to a fixed reference structure 106. The output of the optical sensor 102 is connected 109 with a controller 108. The optical sensor 102 captures a sequence of overlapping images of the subject object 110 and communicates these images to the controller 108. The controller applies a delta detection algorithm to the sequence of images which determines how common features in the images moved from one image to the next, along the x-axis and y-axis. The delta detection algorithm then determines the distance and direction that the object 110 has moved and calculates its new position 112 relative to its previous position 111. Additionally, the controller creates a time stamp for each image by incorporating data on the relative time each image was captured. By associating a time stamp with each image the time elapsed between images is known. The velocity of the object's movement is then calculated by the controller. The resulting velocity, direction, and displacement output is then available to other systems for such applications as process controls or process monitoring, or as error correction feedback data.

Figure 2:
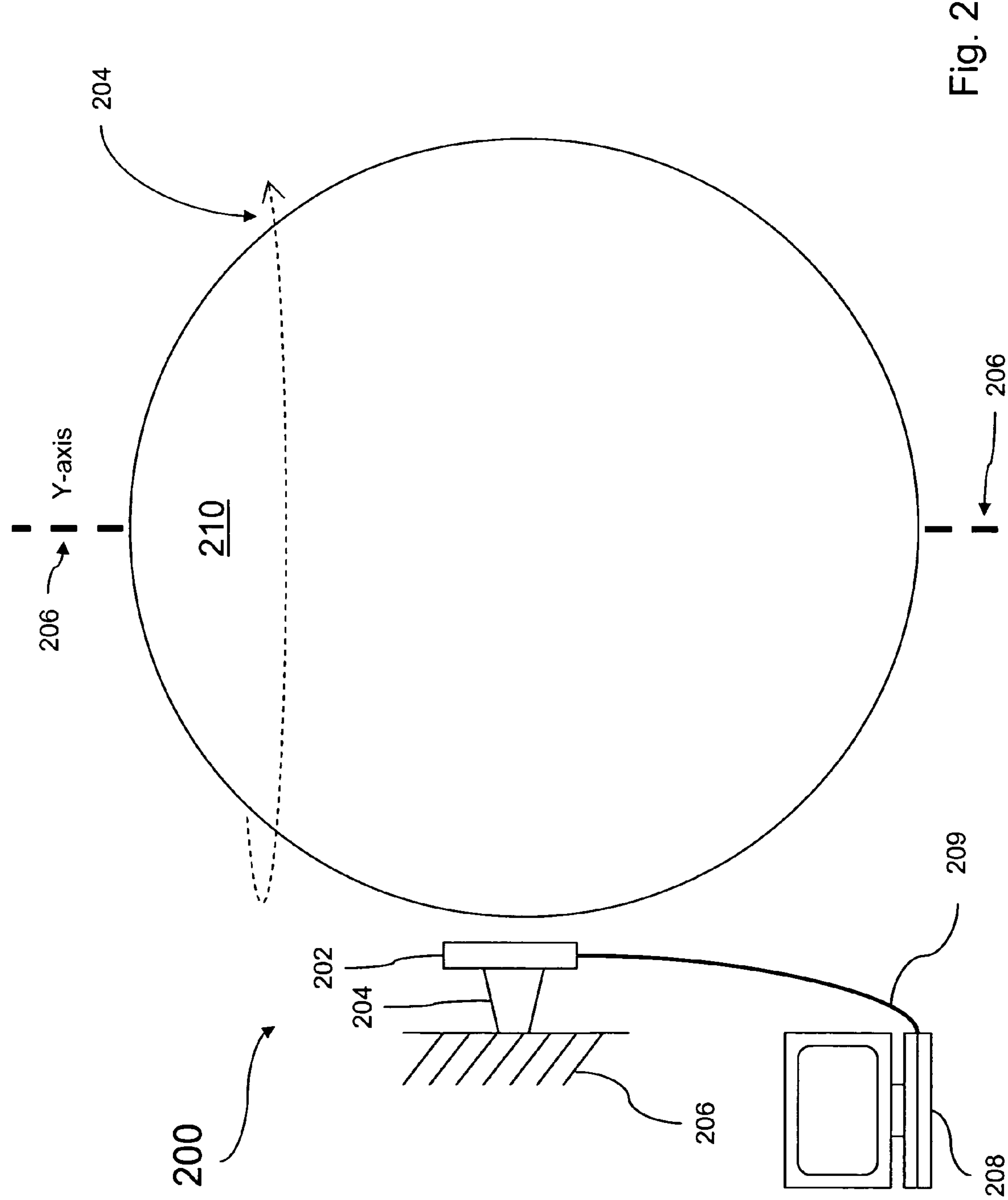
FIG. 2 is a diagram illustrating precise, no-contact, position sensing using imaging, with an object having a spherical surface, of the current invention.

In FIG. 2, a motion detection system 200 of another embodiment of the present invention is illustrated. In this embodiment, the subject object is a sphere 202 that is free to rotate 204 about an axis 206. An optical sensor 202, also commonly referred to as an image acquisition system, is rigidly connected by a mounting bracket 204 to a fixed reference structure 206. The output of the optical sensor 202 is connected 209 with a controller 208. The optical sensor 202 captures a sequence of overlapping images of the subject object 210 and communicates these images to the controller 208. In this embodiment, the x-axis and y-axis displacement data provided by delta detection algorithm is used by the controller 208 to determine the sphere's angle of rotation, its speed of rotation, and the resulting sphere position relative to the previous position. Although FIG. 2 only illustrates the subject object rotating about a single axis, this motion detection system can be applied to a spherical object rotating on multiple axes. Embodiments of the present invention can be used for applications such as measuring the position or movement of raw material in a manufacturing process, for sensing the position of gyroscopes with respect to a fixed housing, robot motion sensing for feedback control, sensing product position in assembly and production facilities, or other systems requiring precision, contact-free, position sensing.

Figure 3:
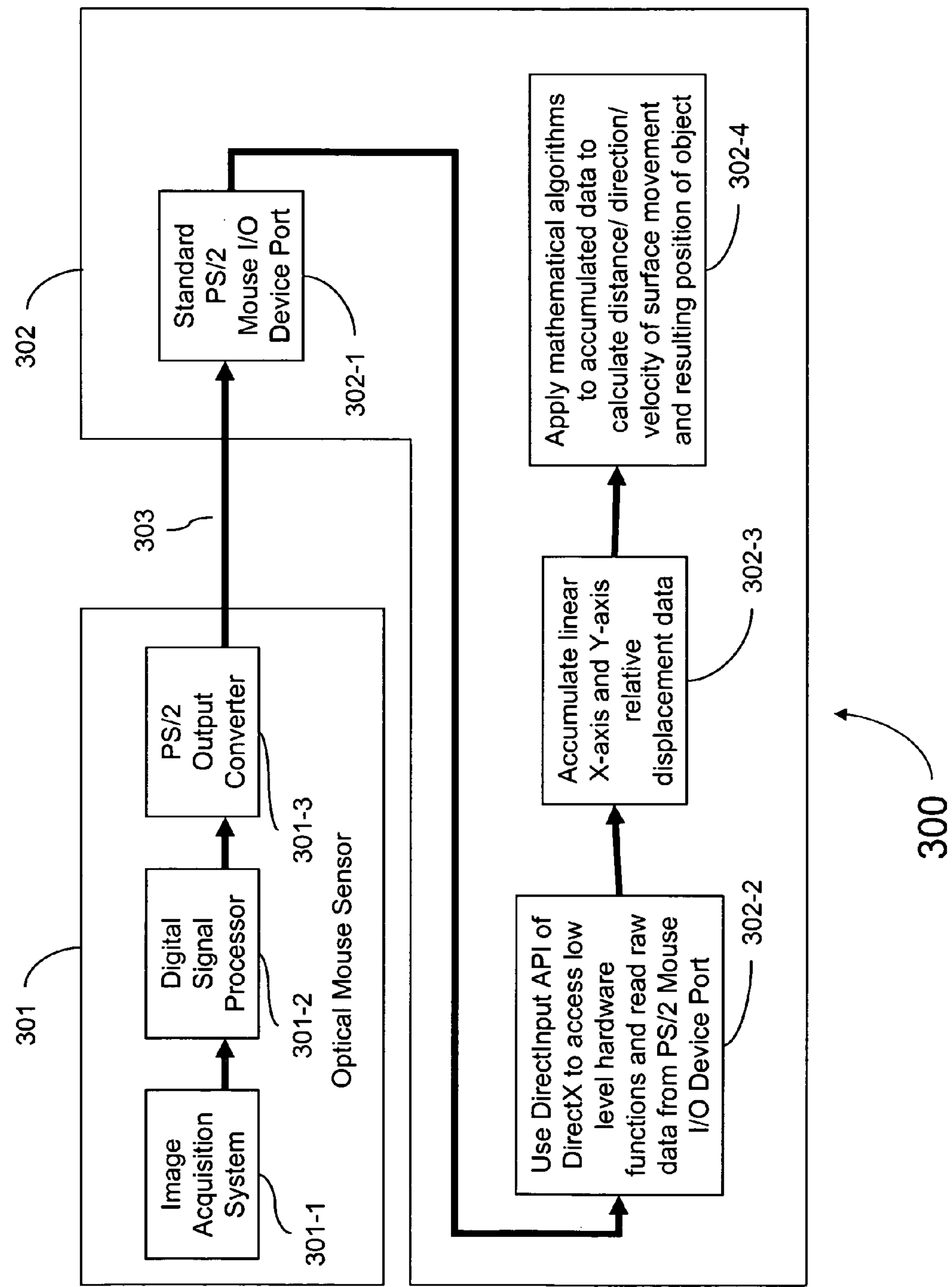
FIG. 3 is a flow chart illustrating the processing of data in one embodiment of the current invention.

In FIG. 3, a motion detection system 300 of another embodiment of the present invention is illustrated, precisely detecting the motion and velocity of an object using an off the shelf computer optical mouse sensor 301 coupled 303 to an Intel based personal computer (PC) running the Microsoft Windows operating system 302. Internal to the optical mouse sensor 301, the optical navigation technology creates a sequence of images 301-1 of the surface of an object in front of the sensor. A digital signal processor 301-2 generates a stream of x-axis and y-axis displacement values proportional to the relative movement of the surface of the object with respect to the sensor. These displacement values are formatted by the PS/2 output converter 301-3 into the proper protocol to communicate the values to a standard PS/2 mouse I/O device port. At the PC 302, the data from the optical mouse sensor 301 is received at the PS/2 mouse I/O device port 302-1. This embodiment of the present invention includes a software program running on the PC 302 which enables the mouse sensor 301 to be used as a precision motion measurement instrument instead of a pointing device. The program receives the data from the PS/2 mouse I/O port 302-1 by applying Microsoft's DirectInput application programming interface (API) 302-2. Microsoft's DirectInput API is an application programming interface for input devices that communicates directly with device hardware drivers and gives faster access to input data than by relying on Microsoft Windows messages. Because DirectInput works directly with the mouse driver, it bypasses the Microsoft Windows subsystem that normally interprets mouse data for windows applications. The software program accumulates the linear x-axis and y-axis displacement values 302-3 it receives from the PS/2 mouse I/O device port 302-1 and then calculates the distance and direction of movement, the average velocity of movement, and the resulting new relative position of the object 302-4.

In other embodiments, the optical mouse sensor 301 and the PC 302 can communicate via a standard universal serial bus, wirelessly, or through other communication standards, rather than through the PS/2 mouse port. In other embodiments, the optical mouse sensor 301 can be an assembly constructed from individual component parts rather than an off-the-shelf optical computer mouse. Moreover, instead of a PC 302 the computer system processing the data can be comprised of any computer system configured to communicate with the optical mouse sensor 301. Because the surface of the object observed by the optical mouse sensor 301 may be either linearly flat in the x-y plane, or may be a nonlinear surface such as a sphere, in other embodiments, the mathematical algorithms 302-3 can be adjusted to map the x-axis and y-axis displacement data into spherical coordinates, cylindrical coordinates, or other system of coordinates in order to calculate the objects direction and distance of movement and the new relative position of the object.

Figure 4:
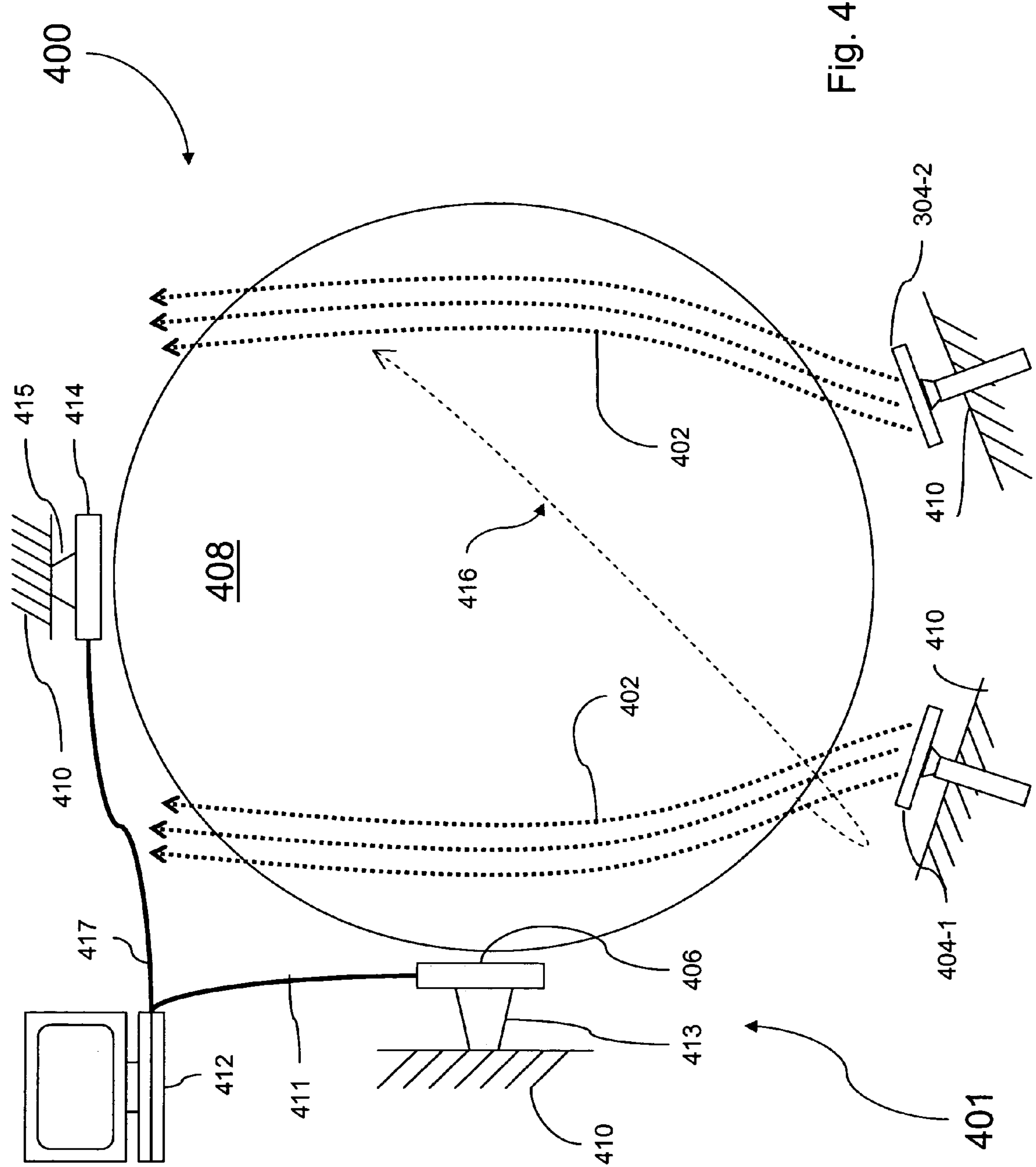
FIG. 4 is a diagram illustrating the combination of precise, no-contact, position sensing using imaging, in combination with a gas supported inertial sensor assembly.

In FIG. 4, a motion detection system 401, in combination with the Gas Supported Inertial Sensor Assembly 400 of the '6540 Application of the preferred embodiment of the present invention is illustrated. A gas supported inertial navigation system (INS) 400 utilizes a freely rotating spherically shaped inertial sensor assembly (ISA) 408. The ISA is supported, or floats, within a spherically shaped gas bearing 402 generated by a plurality of gas pads 404-1, 404-2 (only two of which are shown in FIG. 4). Pressurized gas is applied to the gas pads 404-1, 404-2 and the ISA 408 rides supported on a cushion of gas with little or no contacts between the ISA and the gas pads. In one embodiment, the gas is air. The frictionless gas bearing 402 allows the ISA 408 to rotate on all axes 416. In this embodiment, optical sensors 406 and 414 are secured to the outer shell assembly 410 of the INS 400 by brackets 413 and 415. Additional details regarding the gas bearing 402, gas pads 404 and the INS 400 are found in the '6540 Application herein incorporated by reference. Overlapping images of the inertial sensor assembly 408 are captured by the optical sensors 406, 414 and communicated 411, 417 to a controller 412 where the images are processed through a delta detection algorithm to determine delta-x and delta-y displacement of the images, and the relative change in position between the outer shell assembly 410 and the ISA 408. The controller also calculates the velocity of rotation of the inertial sensor assembly 408 based on the precise time each image was captured. In order to improve accuracy when sensing movement of the ISA 408 along two or more axis, the controller in this embodiment analyses images from two optical sensors 406, 414. Incorporating data from two or more optical sensors allows implementation of better error correction algorithms.

Figure 5:
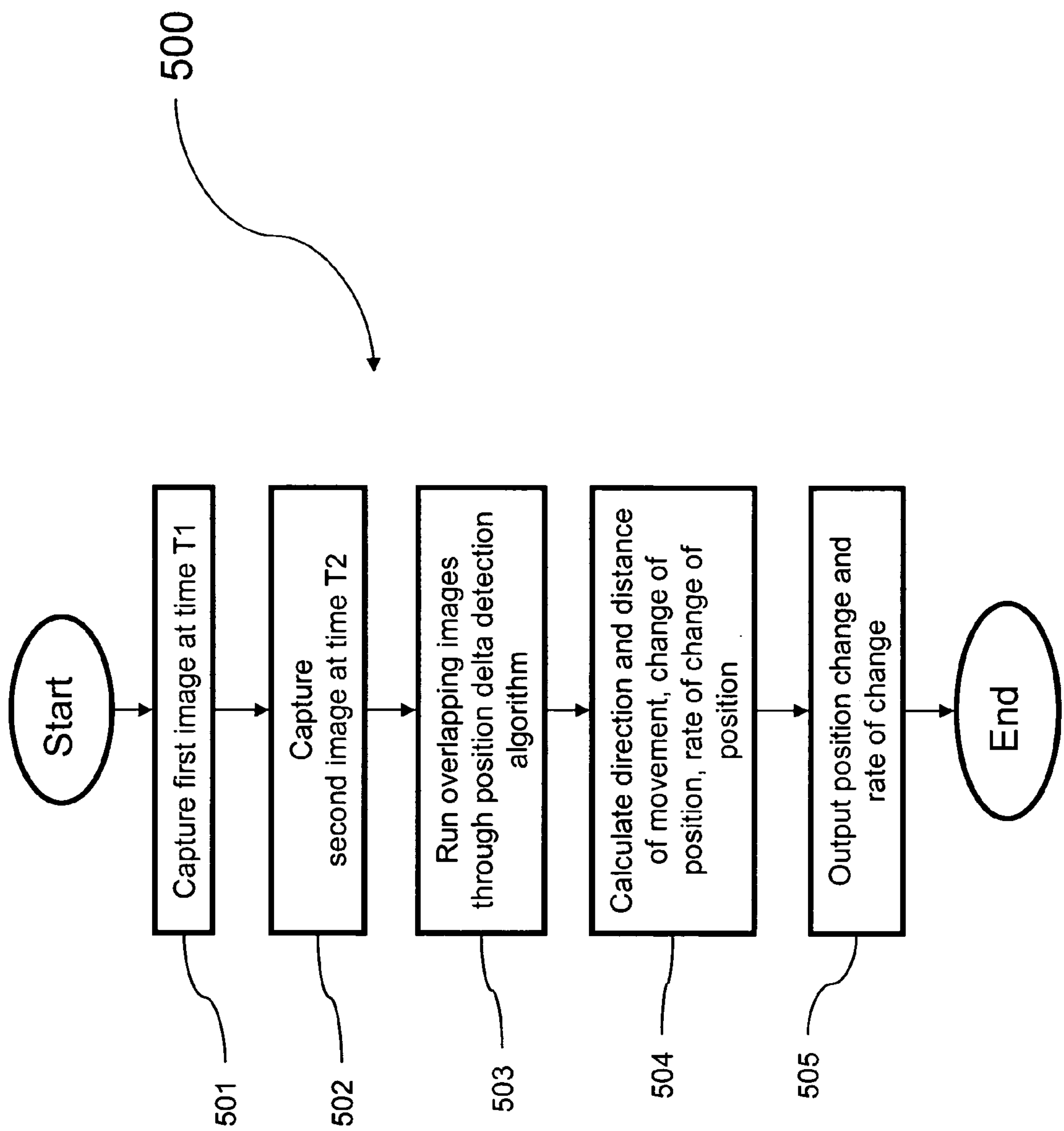
FIG. 5 is a flow chart of one embodiment of the present invention.

In FIG. 5, a method for precisely determining the relative motion of a moving object 500 of an embodiment of the present invention is illustrated. The method comprising: capturing a first image of the object at time T1 (501); capturing a second image of the object precisely at time T2 (502), where the first and second images are taken in sufficiently proximate times so that the first and second images are overlapping images of the object. Processing the first and second images through a delta detection algorithm (503), where the delta detection algorithm determines how far the object surface has moved along the x-axis and y-axis. Calculating the direction and distance of movement, the rate of change in position of the object, and the resulting position of the object (504). Outputting the resulting position and velocity of the object (505).

Several means are available to implement the controller element of the current invention. These means include, but are not limited to, digital computer systems, programmable controllers, or field programmable gate arrays. Therefore other embodiments of the present invention are program instructions resident on computer readable media which when implemented by such controllers, enable the controllers to implement embodiments of the present invention. Computer readable media include any form of computer memory, including but not limited to magnetic disk or tape, CD-ROMs, DVD-ROMs, or any optical data storage system, flash ROM, non-volatile ROM, or RAM.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A rotational displacement sensing apparatus for an inertial navigation system comprising:

an inertial navigation system having a gas bearing supported spherical inertial sensor assembly;

one or more image acquisition systems, each image acquisition system adapted to produce a series of overlapping images of the inertial sensor assembly; and a controller coupled to receive the series of overlapping images, the controller adapted to apply a delta detection algorithm to the series of overlapping images to determine the distance, the direction of movement of the inertial sensor assembly and the resulting relative position of the gas bearing supported spherical inertial sensor assembly, said controller further adapted to calculate the rotational velocity of the inertial sensor assembly based on a time sequence between the received series of image signals and the distance moved.

2. The rotational displacement sensing apparatus for an inertial navigation system of claim 1, further comprising:

an outer shell assembly enveloping the spherical inertial sensor assembly, the optical sensors attached to the outer shell assembly.

3. A method for precisely determining the relative movement and velocity of a moving spherical inertial sensor assembly comprising:

capturing a first image of the spherical inertial sensor assembly precisely at a first known time;

capturing a second image of the spherical inertial sensor assembly precisely at second known time, wherein the first and second images are taken in sufficiently proximate times so that the first and second images are overlapping images of the spherical inertial sensor assembly;

processing the first and second images through a delta detection algorithm, where the delta detection algorithm determines how far the spherical inertial sensor assembly has moved and the direction of movement; and calculating the velocity of the spherical inertial sensor assembly.

4. The method of claim 3 further comprising:

outputting the resulting position and velocity of the spherical inertial sensor assembly.

5. A computer-readable medium having computer-executable instructions for performing a method for precisely determining the relative movement and velocity of a moving spherical inertial sensor assembly, the method comprising:

capturing a first image of the spherical inertial sensor assembly precisely at a first known time;

capturing a second image of the spherical inertial sensor assembly precisely at second known time, where the first and second images are taken in sufficiently proximate times so that the first and second images are overlapping images of the spherical inertial sensor assembly;

processing the first and second images through a delta detection algorithm, where the delta detection algorithm determines how far the spherical inertial sensor assembly has moved and the direction of movement; and calculating the velocity of the spherical inertial sensor assembly.

* * * * *